Aug. 20, 1940.   L. I. YEOMANS   2,212,383
METHOD OF MAKING METAL CASINGS AND PRODUCT THEREOF
Filed April 21, 1937
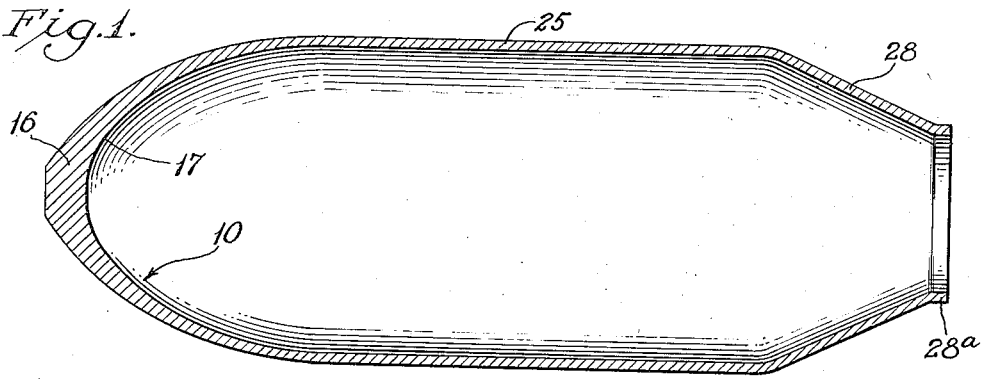
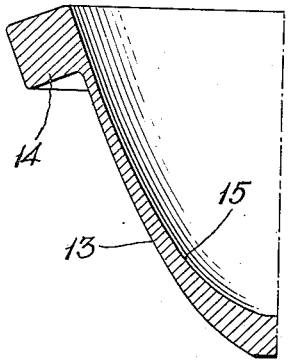 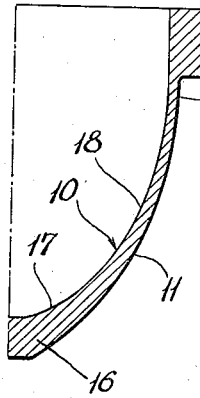 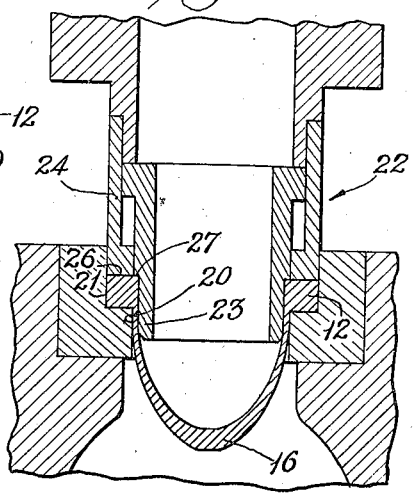
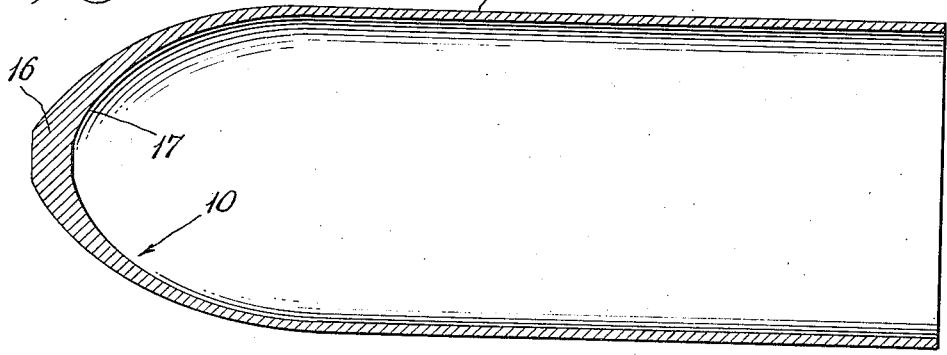
Inventor
Lucien I. Yeomans
BY
Parker, Carlson, Pitzner & Hubbard
Attorneys.

Patented Aug. 20, 1940

2,212,383

UNITED STATES PATENT OFFICE 2,212,383

METHOD OF MAKING METAL CASINGS AND PRODUCT THEREOF

Lucien I. Yeomans, Chicago, Ill., assignor to Lucien I. Yeomans, Incorporated, Chicago, Ill., a corporation of Illinois Application April 21, 1937, Serial No. 138,121

9 Claims. (Cl. 29—1.21)

The invention relates to a novel method of fashioning unitary metal casings such, for example, as demolition bombs, explosive shells, gas drums and the like, as well as to an improved form of such casings.

Bomb shells and explosive casings usually require varying thicknesses of metal in the different parts and it is not uncommon to have such variations range from three inches in the heavier portions to as little as one-half an inch in the parts requiring less weight and strength. It is customary in constructions of this type to provide a hollow casing having a relatively heavy rounded or contoured nose portion, attached to a cylindrical body portion, the thickness of the metal gradually diminishing from the tip of the nose portion to the parallel body portion. A tapering tail section is usually provided in the shape of a hollow cone frustum.

It has been proposed in the manufacture of such a structure to forge or cast a nose piece or to cast and forge such a part to its approximate finished dimensions. In some instances a circular disk has been prepared having a relatively thick center portion, the disk becoming progressively thinner toward its edges, and this blank has been spun or worked into a nose piece, the center of the disk forming the nose tip. In accordance with this plan, a body section having parallel walls is then prepared, either by cutting to the desired length from a seamless, or seam welded, tube or pipe, or by forming such a pipe by press tools, or rolling from a flat sheet and welding the adjacent edges. A hollow truncated cone section is then prepared by forging or pressing a sheet metal blank. The three sections are joined by welding them together along circumferential seams, either by autogenous, flash or arc welding methods.

Such a method entails great expense in the manufacture of the completed structure, due to the time required, the many steps essential to the preparation and joining of the various parts, and the necessary equipment involved. Such processes do not result in an unquestionably reliable unitary structure with the desired metallurgical characteristics throughout. Beads, flash, or other internal and external excrescences are caused by the welding processes and expense is necessary for their removal. A gas tight hermetically sealed structure is not always effectively produced by this method.

The primary object of the present invention is to provide an improved form of metallic casing, as well as a novel method of manufacture therefor in which the casing is fashioned from a single piece of metal into a unitary structure having continuous walls, free of structural irregularities or weaknesses, as distinguished from casings fabricated from component sections and subsequently united by welding or the like into a unitary structure.

A further object of the invention is to provide a new and improved process whereby the production costs of manufacturing casings of this type are materially reduced, a great saving of time and equipment is effected, and a reliable structure of superior quality is produced.

It is a further object of the invention to provide an improved casing fashioned from a single continuous piece of metal, and, more specifically stated, I prefer to accomplish this by forming a hollow nose piece, by centrifugal casting, having an annulus of metal of any desired contour and of sufficient mass to complete the structure, and subsequently fashioning this initial body by extrusion and swaging, spinning, pressing or rolling into the finished bomb.

Further objects and advantages of my invention will become apparent from the following description taken in connection with the accompanying drawing, in which:

Figure 1 is a longitudinal sectional view along the axis of a completed bomb casing embodying the features of the invention.

Fig. 2 is a fragmentary longitudinal sectional view on one side of the axis of an initial centrifugal casting.

Fig. 3 is a similar sectional view of a blank adapted for extrusion.

Fig. 4 is a fragmentary sectional view exemplifying one form of extrusion apparatus and the blank disposed therein prior to extrusion.

Fig. 5 is a longitudinal sectional view of an extruded blank.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In producing a metal casing in accordance with my invention, a salient feature resides in the formation of an initial blank in the shape of a nose piece, said initial blank incorporating an integral mass or annulus of metal of sufficient magnitude to complete the structure by various forming operations. Thus the production of a unitary casing formed in a single piece is made possible and the difficulties heretofore encountered in the manufacture of bombs and explosive shells of this type are eliminated.

In accordance with the preferred application of the method herein contemplated a metal blank is formed in the shape of a hollow ogival nose piece, open at its large end and having a relatively thick mass of metal of any preferred form and of sufficient magnitude to complete the casing integral with the nose piece and surrounding the wall thereof adjacent its open end. Referring more particularly to the drawing, wherein the invention is exemplified as applied to the making of demolition bombs, the blank, illustrated in Fig. 3, is cast or otherwise formed with an inside surface of generally rounded contour as indicated at 10, any desired outside contour 11, and an annulus 12 containing a mass of metal sufficient to supply the requirements of metal for the completion of the unitary bomb structure. Although the invention is illustrated as applied to a generally rounded or ogival nose piece, it is to be understood that it might well be applied to metal casings with flat, square, blunt or arcuate noses.

I prefer to form the initial blank by centrifugal casting methods, in which a mold (not shown) is rotated upon its vertical axis and, while rotated at the proper speed, is supplied with a predetermined amount of molten metal sufficient to form the blank. The mold, having any desired inside contour, which is the outside contour 13 of the centrifugal casting, (illustrated in Fig. 2) has the form of an annulus 14 opening to its upper edge. By such a method of casting, the inside contour 15 of the initial blank is substantially that of the surface of a paraboloid determined by the speed of rotation of the mold and the density of the metal.

It is desirable in a structure of this type to provide a relatively thick wall at the tip of the nose piece and becoming progressively thinner toward the open end of the blank. The density of the molten metal, the speed of rotation of the mold, and the inside contour of the mold are the determining factors in accomplishing this objective. As the speed of rotation of the mold is increased, the molten metal will be forced up higher in the mold by increased centrifugal force, correspondingly increasing the acuteness of the parabolic inside contour of the casting. Adjusting the speed of rotation of the mold for any given or desired inside contour of the initial blank, and for the density of the metal used, a blank may be fashioned having the desired wall thickness in its various sections as otherwise determined or affected by the inside contour of the mold and the quantity of metal supplied thereto. In addition various modifications in the shape of the nose piece may be effected by changing the contour of the mold.

It is desirable to modify the form of such a centrifugal casting, as shown in Fig. 2, from a substantially parabolic contour to a shape which may be partly parabolic with the remainder distorted into a contour of other characteristics. In the present instance the casting is altered in form by contraction of the annulus and the adjacent wall of the nose piece, whereby the parabolic section gradually blends or merges into a parallel walled or short cylindrical section adjacent the annulus. The said contraction may be effected by swaging the annulus and adjacent wall by any of the well-known hot or cold reducing methods, wherein the work is caused to be struck a large number of successive blows by dies or hammers or by the use of press tools. The preferred shape of blank (Fig. 3) thus formed includes a nose piece having a thick walled section 16 immediately adjacent the tip, the inside contour 17 of this section being substantially parabolic, and a section 18 having a relatively thinner wall and a contour blending into a short cylindrical section 19 adjacent the annulus 12.

The annulus of the initial blank thus formed is shaped into an extended body wall preferably by extrusion, wherein the metal to be formed, which is usually heated, is forced under high pressure through an aperture of the shape to be produced. The blank, as shown in Fig. 3, may be uniformly heated to a suitable extrusion temperature and placed in an extrusion die (illustrated in Fig. 4).

The extrusion die illustrated has a throat opening 20 of the size and shape of the desired outside contour of the body section and a recess 21 adapted to closely conform to the outside diameter of the annulus but somewhat deeper than the depth of the annulus. When the blank is placed in the die a shoulder punch 22, having a pilot portion 23 and a shoulder portion 24, is brought down upon the annulus. The pilot portion, having a diameter equal to that desired for the interior surface of the body wall of the structure, is adapted to enter the blank, and the shoulder portion is adapted to engage the top surface of the annulus and closely fit between the pilot portion and the recess of the die. Sufficient pressure is applied to the shoulder punch to extrude the supply of metal existing in the annulus between the throat of the die and the pilot portion of the punch, thus forming the extended body section 25 of the bomb, as shown in Fig. 5.

The shouldered portion of the punch is made up of two sections, an outer section 26 having an inside diameter equal approximately to the throat diameter of the die and an outside diameter closely fitting the die recess, and an inner shouldered section 27 integral with the pilot portion of the punch and having an inside diameter approximately that of the punch pilot and an outside diameter freely fitting the inside of the outer section. These two shoulder sections together have a combined annular face equal to the annular space between the pilot of the punch and the recessed wall of the die.

Both sections travel downwardly together during the extrusion of the mass of the annulus into the body wall of the structure being formed and until a relatvely thin remnant of the annulus remains within the die recess. When this point is reached the outer section of the punch shoulder ceases to move, being opposed by excessive resistance, but the inner section integral with the pilot section continues its downward movement, on account of a resistance far less than that encountered by the outer section, and in its travel shears the remnant of the annulus from the extruded wall of the body section, and carries the extruded structure through the die to a point where it in unconfined and is released and appears as shown in Fig. 5.

The punch may be actuated by any suitable mechanical or preferably hydraulic press having two relatively movable concentric plungers, the outer plunger (as indicated in Fig. 4), bearing on both the shoulder portion 24 and the pilot portion 23 of the punch and the inner or circumscribed plunger pressing only on the pilot portion. Thus as the outer shoulder portion of the punch reaches the point in the extrusion process where it is opposed by excessive resistance, it will cease to move and the inner plunger, bearing on the pilot portion of the punch only, will cause the latter to continue its downward movement, shearing the remnant of the annulus to complete the process.

A tapered tail section 28, (Fig. 1), may be provided for the casing in substantially the shape of a hollow frustum of a cone terminating in a short cylindrical section 28ª. This operation involves the progressive reduction of the diameter of a section of the cylindrical body wall toward its open end. The wall of the open end of the extruded shell may be thinned, as desired, before reduction to this form. I prefer to employ a swaging operation for reduction of the diameter which involves heating that portion which is to be reduced and then rotating the shell and swaging it between hammer dies. It is to be understood, however, that this operation might well be accomplished by any one of a number of processes including pressing a full form solid die down upon the section in a press, spinning, rolling on an arbor, or otherwise, in the manner in which ordnance shells are usually "bottled."

It will be evident from the above description of my invention that metal casings manufactured in accordance therewith are relatively inexpensive, economical and adapted to be made by an automatic process in production quantities effecting a great saving of time and equipment over prior art practices, and at the same time are free from defects and excrescences, one of the important advantages being that casings made by this process are uniform in quality and reliable in service.

I claim as my invention:

1. The process of constructing a metal casing which comprises centrifugally casting metal to form an initial hollow body open at one end and having an external wall of ogival shape and an internal wall of parabolic shape, with the closed end of the body relatively thick and the wall of the body tapering in thickness progressively away from said closed end toward the open end, said body having an external integral annulus at its open end of a thickness greater than that of the adjacent portion of said wall and sufficient in cross sectional dimensions to provide a mass to be extruded in completing the casing; then contracting said annulus and a portion of said wall adjacent to the open end of said body to provide a cylindrical interior to said portion; and then extending the cylindrical portion by extrusion of the mass of metal in said annulus to form an integral cylindrical continuation providing the main portion of said casing; and finally reducing the thickness of the portion of said cylindrical continuation adjacent its open end and progressively reducing the diameter of such thinned portion toward the end.

2. The process of forming an initial casting which comprises rotating a mold with its axis disposed vertically and supplying molten metal to said mold to form a hollow body open at one end and having an external wall of ogival shape and an internal wall of parabolic shape, with the closed end of the body relatively thick and the wall of the body tapering in thickness progressively away from said closed end toward the open end, said body having an external integral annulus at its open end of a thickness greater than that of the adjacent portion of said wall and sufficient in cross sectional dimensions to provide a mass to be extruded in completing the ultimate casing, said mold being rotated at such a speed as to create sufficient centrifugal force on the metal to act as the sole medium for forming the internal shape of said body, as distinguished from the use of an inner mold in conjunction with an outer mold.

3. The process of forming a metal casing which comprises centrifugally casting metal to form an initial open hollow body of internally parabolic shape and having an external integral annulus at its open end of sufficient mass to be extruded in completing the casing; then contracting said annulus and a portion of said wall adjacent to the open end of said body by hot working to provide a cylindrical walled portion adjacent said annulus and to render the centrifugally cast metal in said annulus more readily adapted for extrusion.

4. The process of constructing a metal casing which comprises centrifugally casting metal to form an initial open hollow body having a substantially parabolic inner contour, said body having an integral annulus at its open end of a thickness sufficiently great to provide a mass to be extruded in completing the casing; then contracting said annulus and a portion of said wall adjacent to the open end of said body by hot working to provide a cylindrical interior portion and to render the cast metal more susceptible to extrusion; and finally extending said cylindrical portion by extrusion of the mass of metal in said annulus to form an integral cylindrical continuation forming the main body of said casing.

5. The process of constructing a metal casing which comprises centrifugally casting metal to form an initial hollow body having an internal wall of substantially parabolic shape, said body having an integral annulus at its open end of a thickness sufficiently great to provide a mass to be extruded in completing the casing; then contracting said annulus and a portion of said wall adjacent to the open end of said body to provide a cylindrical walled portion; and then extending said cylindrical portion by extrusion of the mass of metal in said annulus to form an integral cylindrical continuation, and finally progressively reducing the diameter of a portion of said cylindrical continuation toward the open end.

6. The process of constructing a metal casing which comprises centrifugally casting metal to form an initial open hollow body having a substantially ogival shape, said body having an external integral annulus at its open end; and then forming a cylindrical continuation by extrusion of the mass of metal in said annulus to provide the main portion of said casing; and finally reducing the thickness of the portion of said cylindrical continuation adjacent its open end and progressively reducing the diameter of such thinned portion toward the open end.

7. A centrifugal casting for the manufacture of metallic casings, said casting comprising a hollow body open at one end and having an external wall of ogival shape and an internal wall of paraboloidal contour, the nose or closed end of the body having a relatively thick wall, said wall becoming progressively thinner toward the open end of the body, and an external annulus integral with the body at its open end.

8. A unitary metallic casing including a centrifugally cast hollow nose section having an ogival exterior contour and a substantially parabolic inner contour, said nose section having a relatively thick wall adjacent the tip thereof, said wall becoming progressively thinner away from the tip; an extruded cylindrical body wall continuous and integral with the wall of the nose section; and an integral tail section becoming progressively smaller in diameter toward the end of the shell and having a substantially uniform wall thickness.

9. A unitary metallic shell including a centrifugally cast hollow ogival nose with a substantially parabolic inner contour, and an extruded cylindrical continuation integral with the wall of the nose.

LUCIEN I. YEOMANS.